FILM PERFORATING APPARATUS

Filed Aug. 23, 1965 9 Sheets-Sheet 1

INVENTOR
KEITH S. CARMICHAEL

BY A. Ralph Snyder

ATTORNEY

Dec. 5, 1967 K. S. CARMICHAEL 3,355,974

FILM PERFORATING APPARATUS

Filed Aug. 23, 1965 9 Sheets-Sheet 2

INVENTOR
KEITH S. CARMICHAEL

BY *A. Ralph Snyder*

ATTORNEY

INVENTOR
KEITH S. CARMICHAEL

BY A. Ralph Snyder

ATTORNEY

INVENTOR
KEITH S. CARMICHAEL

BY A. Ralph Snyder

ATTORNEY

Dec. 5, 1967 K. S. CARMICHAEL 3,355,974

FILM PERFORATING APPARATUS

Filed Aug. 23, 1965 9 Sheets-Sheet 5

INVENTOR
KEITH .S CARMICHAEL

BY A. Ralph Snyder

ATTORNEY

Dec. 5, 1967 K. S. CARMICHAEL 3,355,974

FILM PERFORATING APPARATUS

Filed Aug. 23, 1965 9 Sheets-Sheet 6

INVENTOR
KEITH S. CARMICHAEL

BY A. Ralph Snyder

ATTORNEY

Dec. 5, 1967 K. S. CARMICHAEL 3,355,974

FILM PERFORATING APPARATUS

Filed Aug. 23, 1965 9 Sheets-Sheet 7

INVENTOR
KEITH S. CARMICHAEL

BY A. Ralph Snyder

ATTORNEY

FILM PERFORATING APPARATUS

INVENTOR

KEITH S. CARMICHAEL

BY *[signature]*

ATTORNEY

INVENTOR
KEITH S. CARMICHAEL

BY A. Ralph Snyder,
ATTORNEY

United States Patent Office 3,355,974 Patented Dec. 5, 1967

3,355,974

FILM-PERFORATING APPARATUS

Keith S. Carmichael, Claymont, Del., assignor to E. I. du Pont de Nemours and Company, Wilmington, Del., a corporation of Delaware Filed Aug. 23, 1965, Ser. No. 481,695
2 Claims. (Cl. 83—171)

ABSTRACT OF THE DISCLOSURE

Apparatus for precision perforating thermoplastic film comprising a cooled, rotatable outer drum provided with a plurality of perforations and positioned to contact a travelling web of film to be perforated; a pin drum having a plurality of heated tapered pins extending radially therefrom to conform with the perforations of said outer drum, said pin drum mounted within said outer drum for rotation on an axis offset from the rotational axis of the outer drum and positioned so that the pins protrude through said perforations along a portion of the circumference of the outer drum; gear drive means for rotating both drums in the same direction; means for adjustment of the pin drum center relative to the outer drum center whereby to permit adjustment of the length of protrusion of the tapered pins through the outer drum perforations and hence adjustment of the size of perforations made in the film; and means for shifting the assembly of drums, as a unit, transversely of the direction of travel of the web of film whereby to vary the perforations across the web.

The use of films of thermoplastic materials, for example, polyolefin films, for packaging purposes is well known. It is some times desirable for the packaging film to be perforated, especially in packaging fresh produce, to allow natural ripening to take place with controlled moisture transmission. Machines have been employed to produce perforations in such films; however, they have the disadvantage of being unable to reproduce, precisely, perforations of a desired shape at high speeds. For example, speeds of only up to 400 feet of film per minute can be obtained by the machine described in U.S. Patent 2,748,863, and only then at high temperatures. In addition, such machines cannot produce round holes, but are limited to oval ones.

Therefore, it is an object of this invention to provide a machine for perforating thermoplastic films with precise, stable, reinforced perforations at high speeds. Other objects include providing such a machine for consistently producing such perforations at given settings and speeds, and providing such a machine in which the size of the perforations can be varied. These and other objects will become apparent hereinafter and upon inspection of the drawings, in which.

The objects of this invention are accomplished by providing a frame;

An outer drum having a plurality of perforations mounted on said frame for rotation;

A pin drum having a plurality of tapered pins extending radially therefrom to conform with the perforations of said outer drum, said pin drum mounted within said outer drum for rotation on an axis offset from the rotational axis of said outer drum, and positioned such that said pins protrude through said perforations along a portion of the circumference of said outer drum;

Gear means to rotate both said drums in the same direction such that said pins progressively protrude through said perforations and retract with no metal-to-metal contact; said gear means so positioned and constructed to provide for adjustment of said pin drum center relative to said outer drum center;

Means positioned within said pin drum to uniformly heat said pins; and

Means positioned within said outer drum to cool said drum.

The device can also include a chill roll over which the perforated film is passed to cool the melt polymer ring around each hole. If not so cooled, the hot polymer will mark the film layers in the roll. The device can also include means to shift the perforator frame in a set pattern so as to vary the perforations across the web of film. Thus when the perforated film is rolled, a smooth slit roll is obtained. Without the offset of holes, the ridges around each hole will create an uneven roll.

Figures 1, 2:
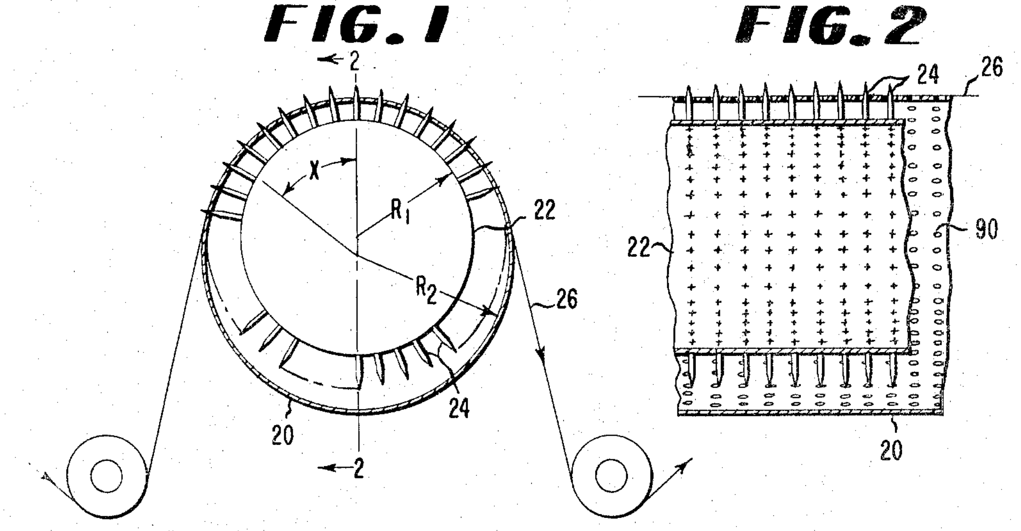
FIGURE 1 is an end view of an eccentrically mounted outer drum and pin drum in which the pin drum is offset to allow its pins to protrude through perforations in the outer drug along a portion of the outer drum circumference.
FIGURE 2 is a sectional view taken along lines 2—2 of FIGURE 1.

Referring now to FIGURES 1 and 2, the objects of the invention are accomplished by an eccentric roll perforator which consists of an outer cooled drum or cylinder 20 which has been perforated in a desired pattern with holes 90 and an inner pin drum or cylinder 22 with radially protruding heated pins 24 set into it in the same pattern as the perforations in the outer drum. The pin drum is smaller and is mounted inside the outer drum such that it turns on an axis $R_1$ which is offset from the rotational axis $R_2$ of the outer drum. Both drums are geared together so that the pins progressively protrude through the perforations in the outer drum and then retract with no metal-to-metal contact as both drums turn about their centers.

The pins are heated to a temperature sufficient to perforate the film 26. Then because the film speed is equal to the outer drum speed, the hot pins protrude through the perforations in the outer drum and cause the film to melt at that point. As both drums continue to turn, the pins then withdraw to leave an almost perfectly round reinforced hole in the film.

Because of the offset rotational axes of the two drums, it is apparent that the pins enter the film after the film has conformed to the outer drum. The film is supported by and clings to the drum. This friction between the drum and the film keeps the film from moving as the pins enter the film, thereby enabling accurate holes to be consistently made in the film. Since the pins are tapered, the point of the pin will enter and retract within the maximum diameter of the hole to be made thereby ensuring a perfectly formed perforation. Thus, the oval shaped holes encountered by the conventional opposing drum perforating machines are avoided. The size of the holes for a given setting and speeds are constant because the film is supported by the outer drum while being perforated by the pins. Even though the pins are hot, some force is still exerted against the film by the pins as they enter the film. The clinging of the film to the outer drum enables the pin to push through the film.

The acceleration of the pin entering the film decreases as the pin proceeds to maximum protrusion. This decrease in acceleration increases the time of engagement of the hot pin with the film as the area of film to be melted (greater hole diameter) increases. After perforating the film, the pins retreat inside the outer drum and reheat during the remainder of the revolution. The temperature inside the outer drum is consistently higher than the ambient temperature and assists in reheating the pins, The perforations formed are of the melted type with a strengthening grommet of polymer surrounding each hole.

The size of the holes in the film can be changed by providing a mechanical adjustment to move the axis of the pin drum toward or away from the axis of the outer drum. This movement varies the length of protrusion of the pins through the holes of the outer drum, and since the pins are tapered, the size of the holes made in the film can be thusly varied.

Figure 6:
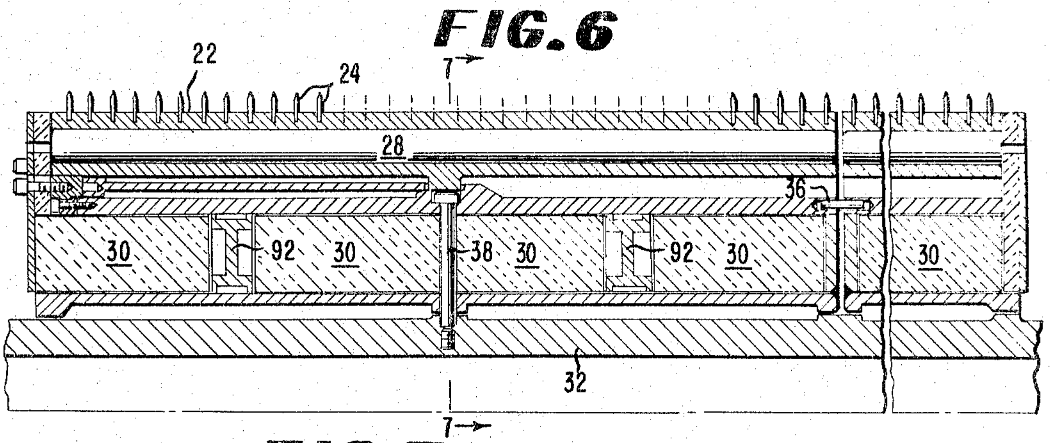
FIGURE 6 is a cross-sectional view of a portion of the pin drum taken along its longitudinal axis.
Figures 7, 8, 8A:
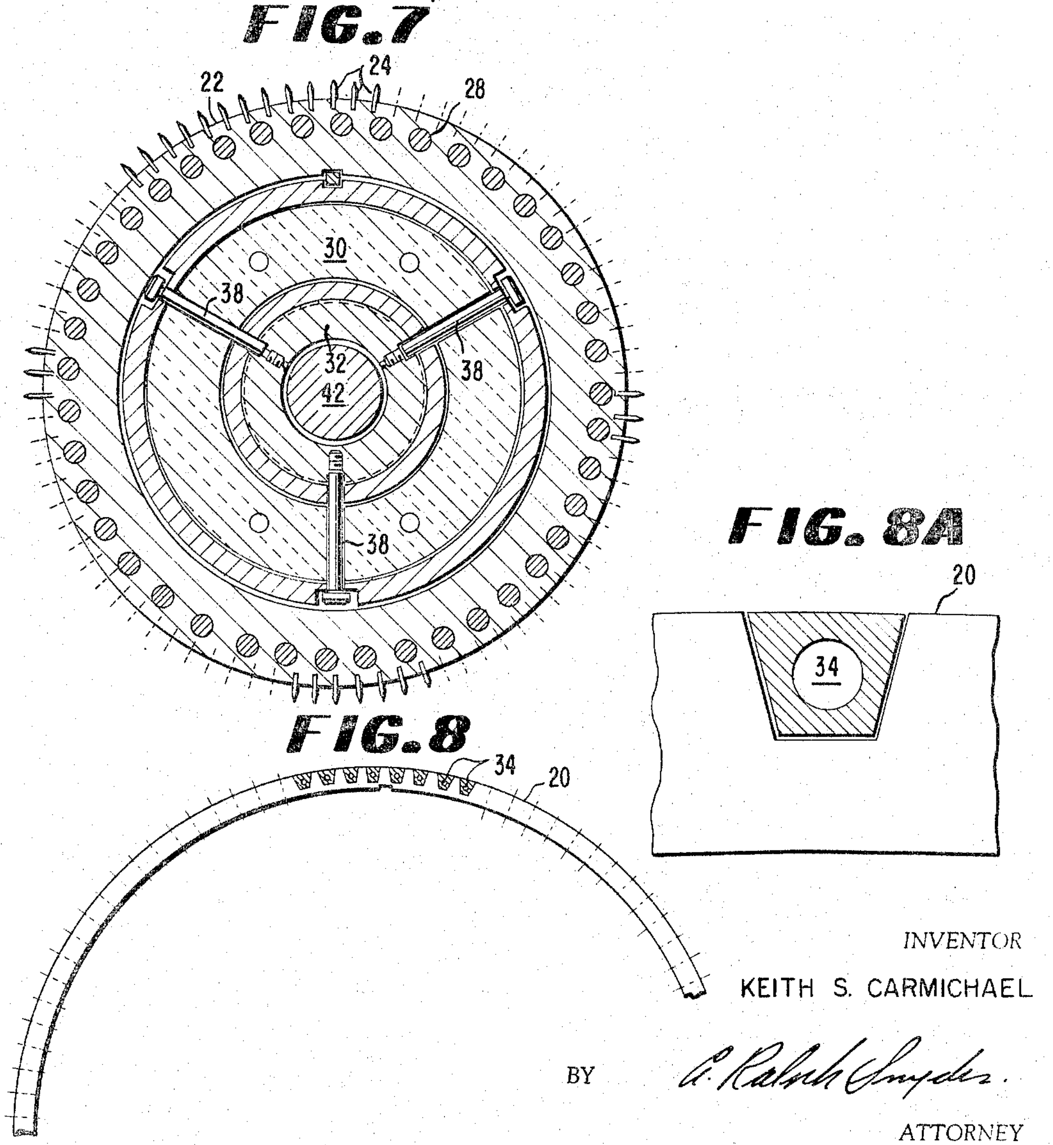
FIGURE 7 is a cross-sectional view of the diameter of the pin drum taken along lines 7—7 of FIGURE 6.
FIGURE 8 is a cross-sectional view of the outer drum.
FIGURE 8A is an enlarged view of the cooling tubes of FIGURE 8.
Figure 9A:
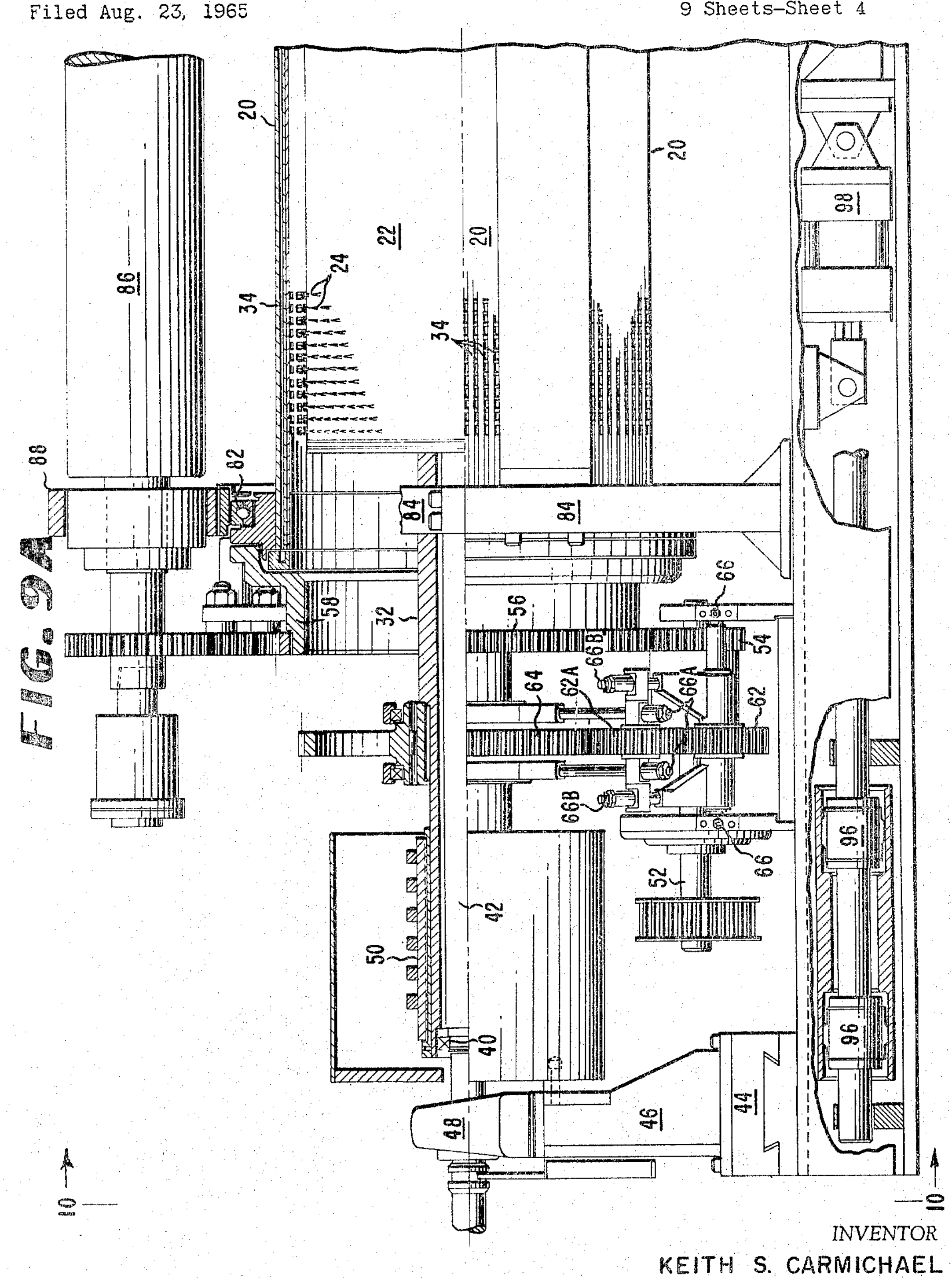
FIGURES 9A and 9B are front views of the device of the invention.
Figure 9B:
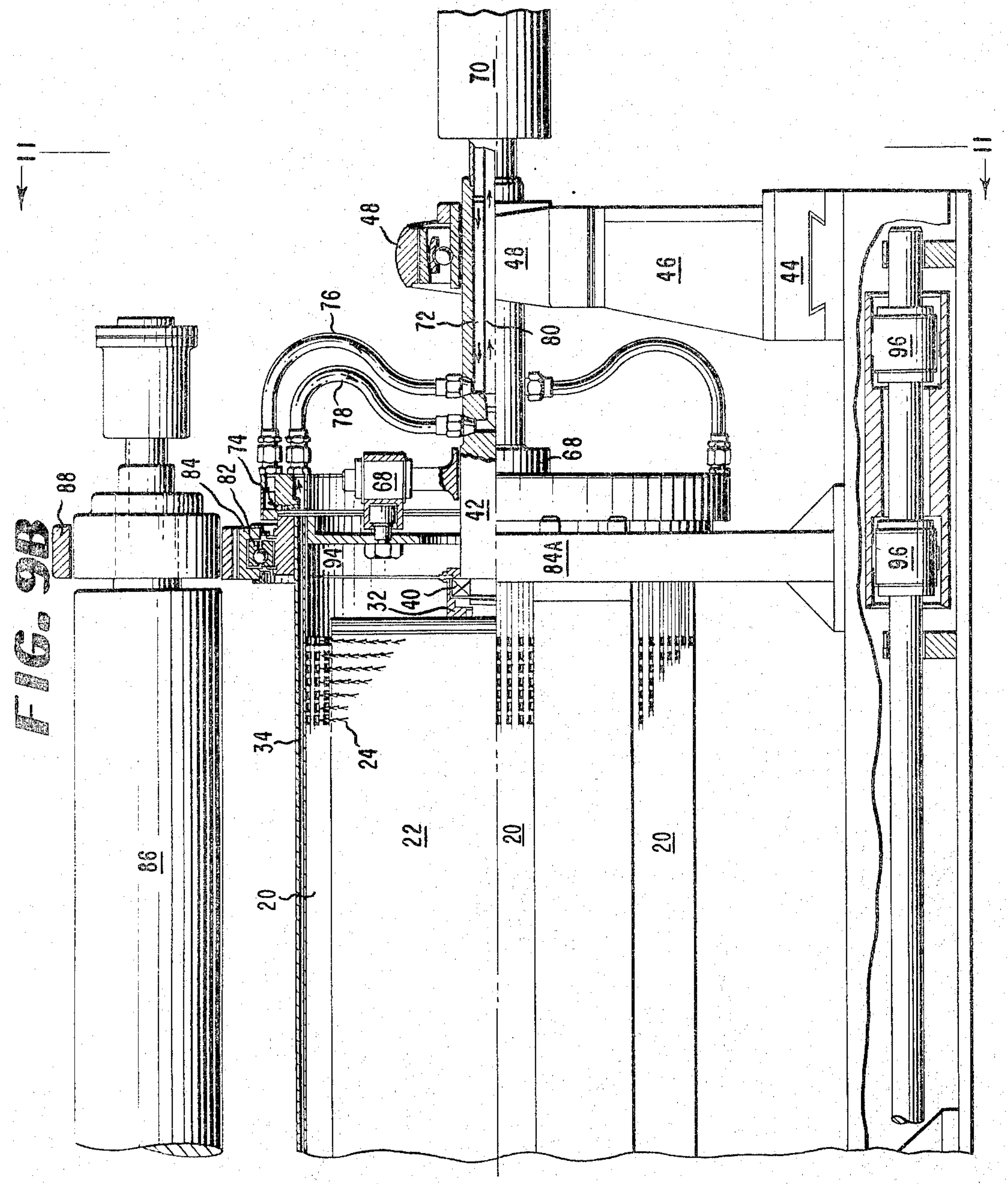
Figure 10:
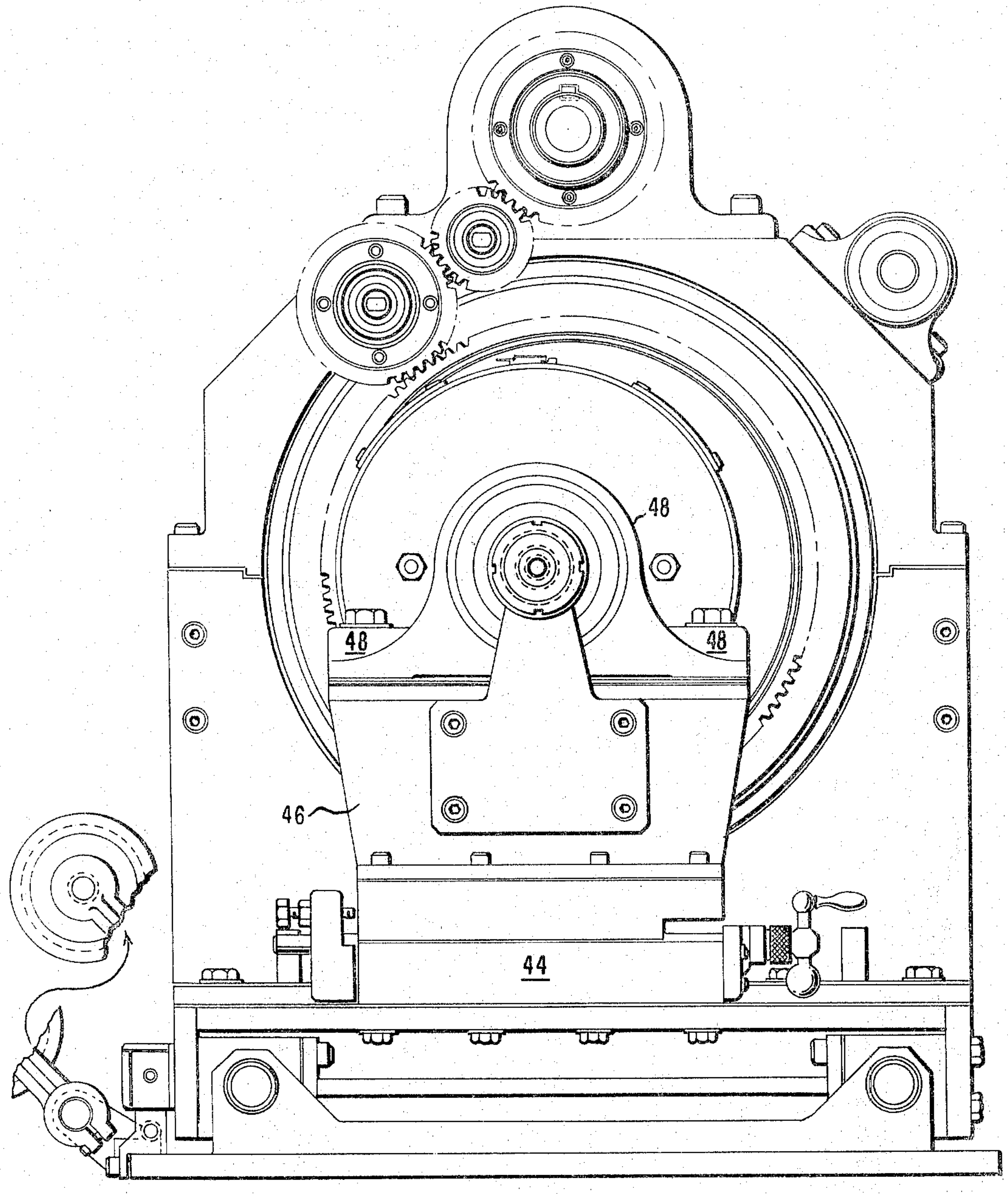
FIGURE 10 is an end view of the device taken along line 10—10 of FIGURE 9A.
Figure 11:
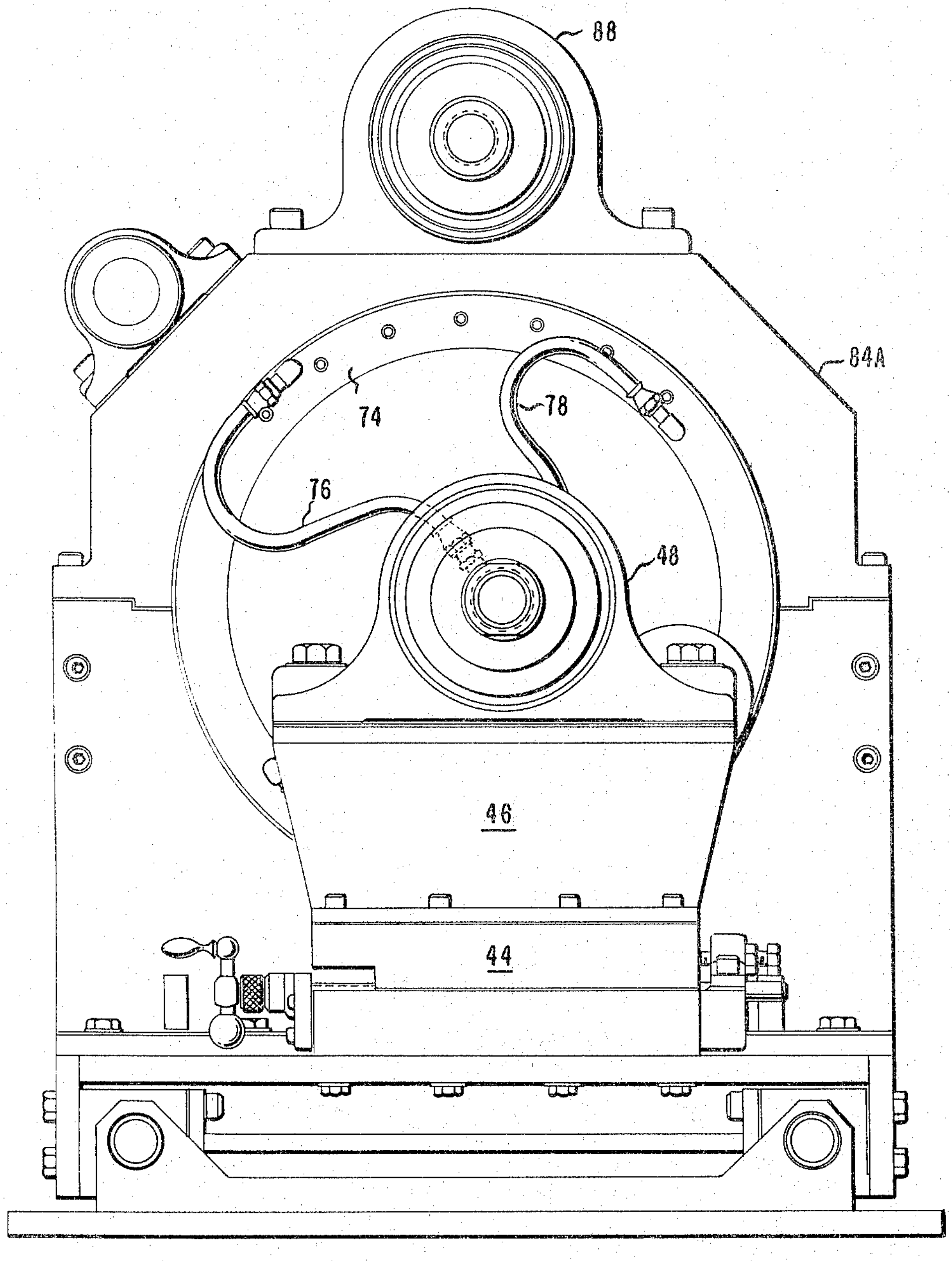
FIGURE 11 is a view of the opposite end of the device taken along line 11—11 of FIGURE 9B.
Figure 12:
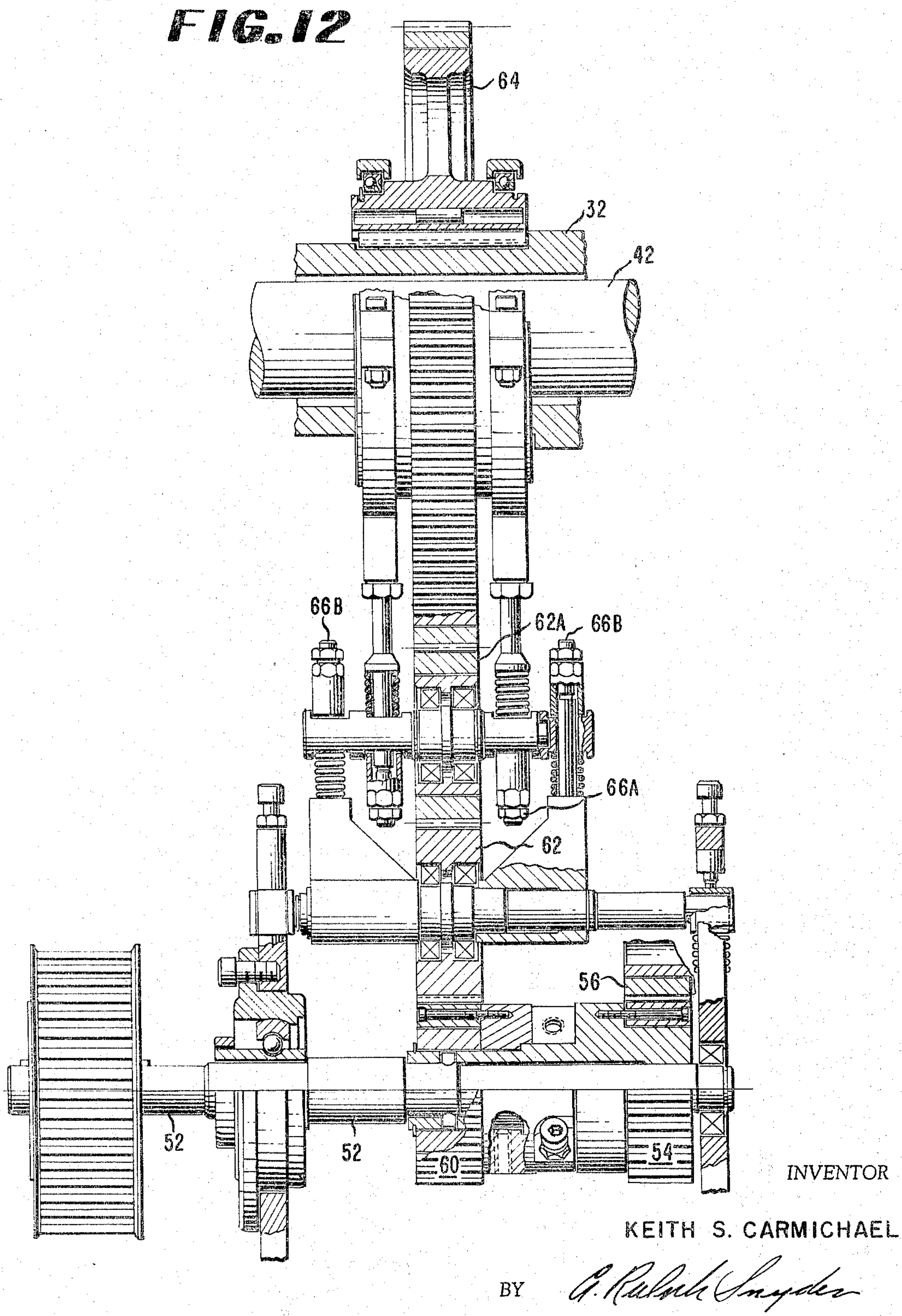
FIGURE 12 is a front view of the gear train which drives the two drums in synchronization and allows adjustability of the pin drum center relative to the outer drum center for pin protrusion.
Figure 13:
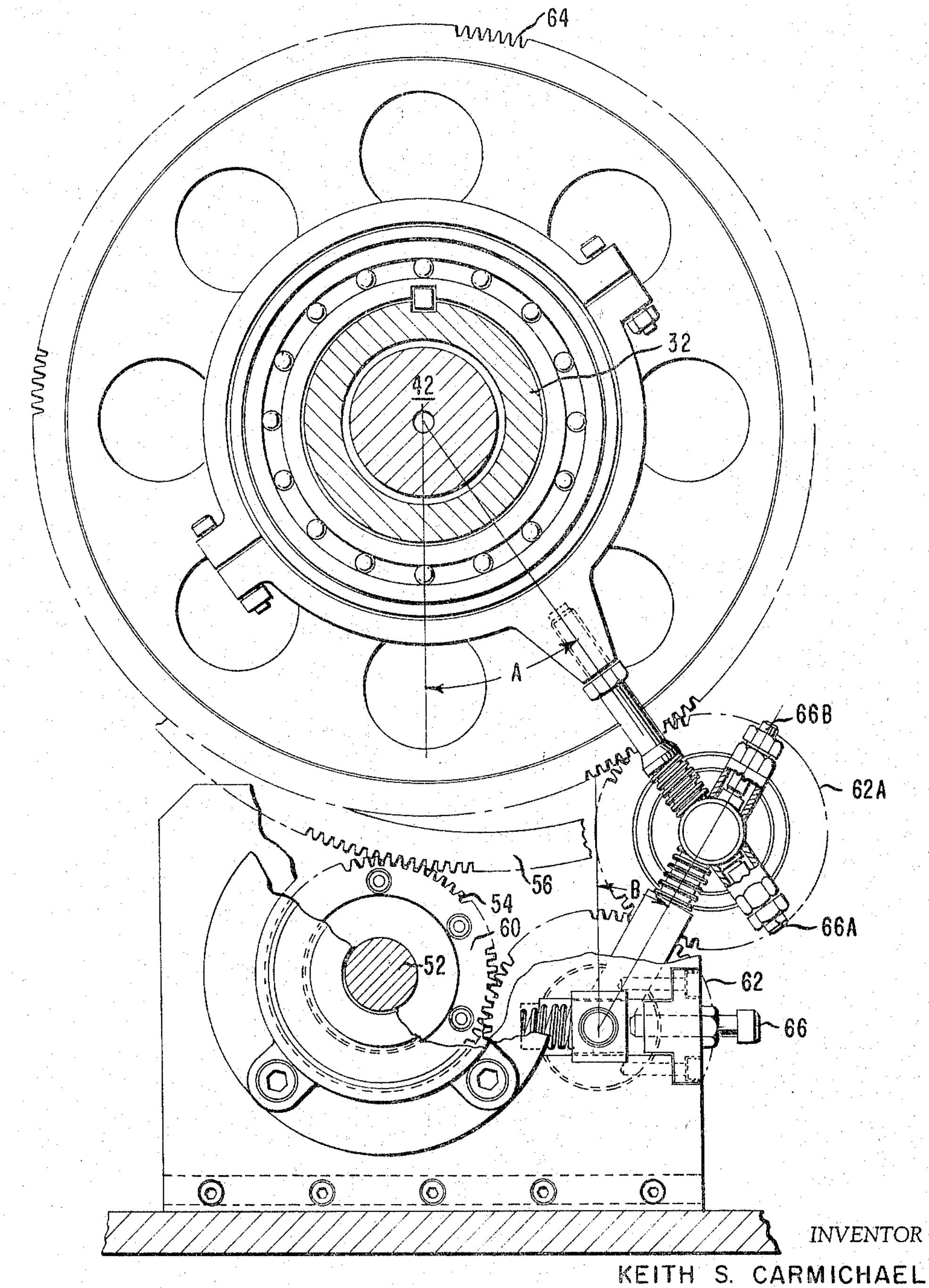
FIGURE 13 is a side view of said gear train.

In order to effectively perforate the film, the temperature of the pins must be sufficiently high to melt the film and to prevent the melted polymer from sticking to the hot pin. The heating is accomplished by a heating means such as a radiant heater, a carbon arc discharge, electrical resistance, hot gases, induction heating, and the like. FIGURES 6 and 7 show the inside of the hollow pin drum and disclose a number of cartridge heaters 28 located longitudinally inside the drum closely adjacent the pins and centered between the longitudinal rows of pins so that each pin is the same distance from the heater. For polyethylene films a pin drum temperature of about 425° C. to 450° C. has been found effective.

Figure 3:
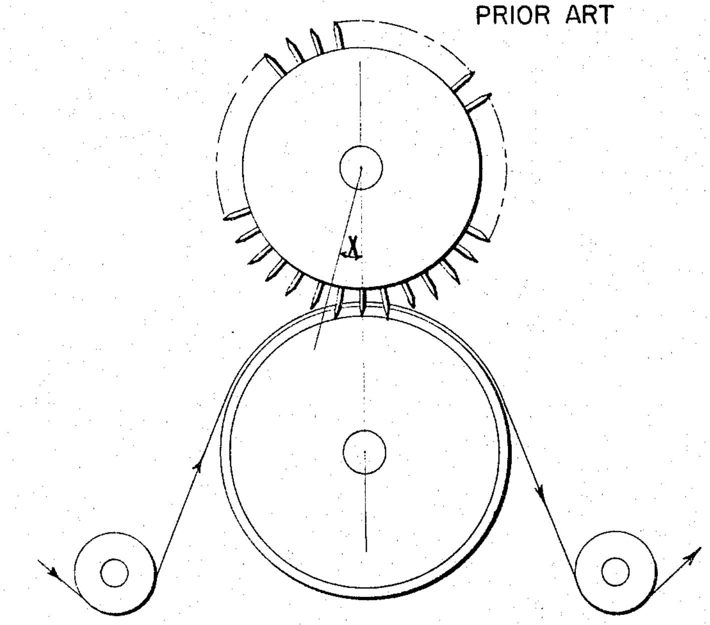
FIG. 3 PRIOR ART
FIGURE 3 is a schematic drawing of a conventional opposed roll device.
Figure 4:
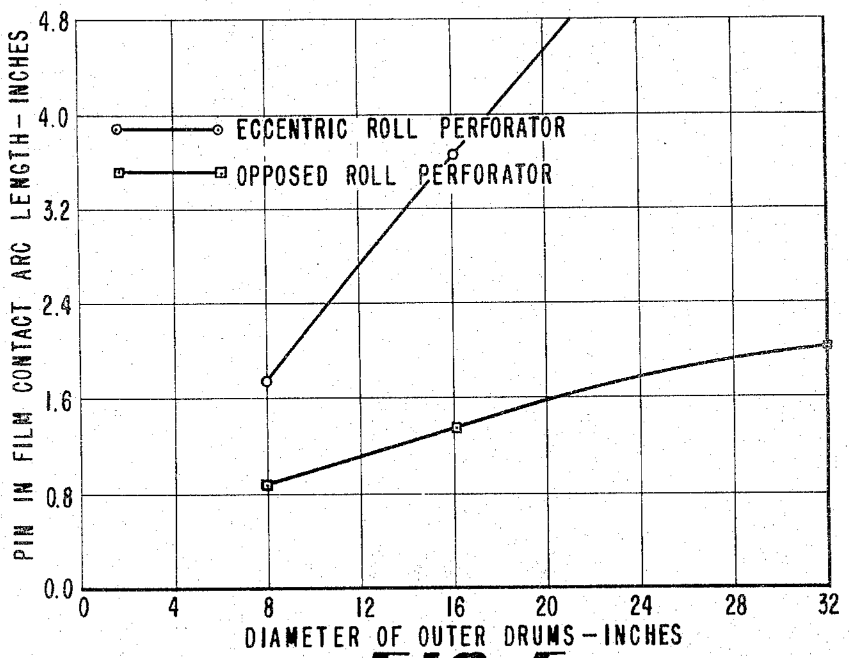
FIGURE 4 is a graph plotting contact arc length of pin to film vs. diameter of outer drum for the device of this invention and the conventional opposed roll device.
Figure 5:
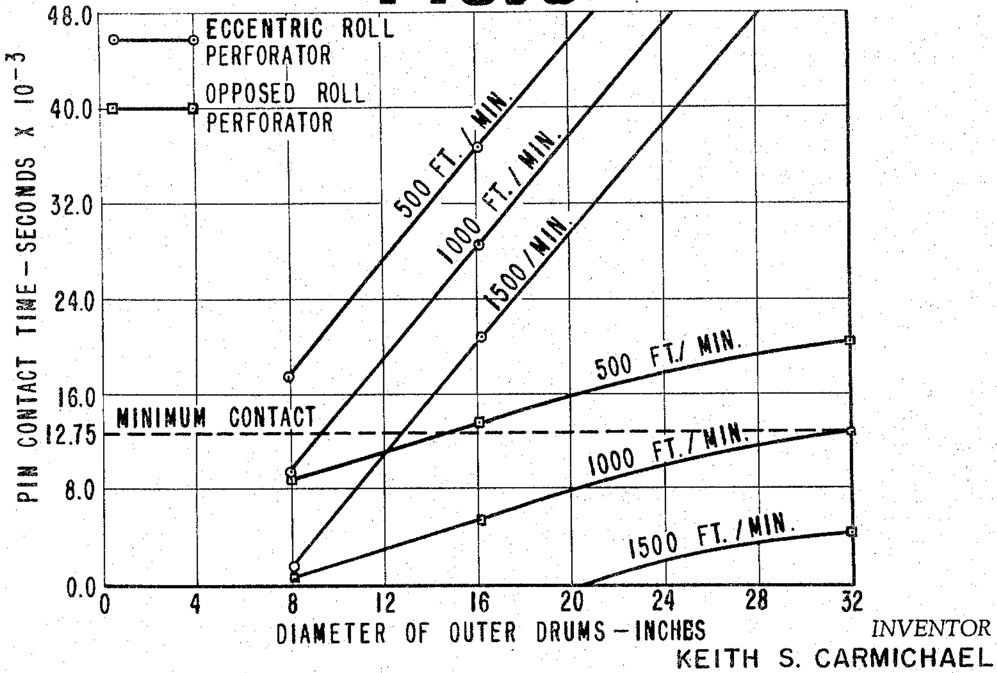
FIGURE 5 is a graph plotting contact time of pin to film vs. outer drum diameter for the device of this invention and the conventional opposed roll device.

In any polymer film perforating device, it is important that the hot pins remain in contact with the film long enough for the film to melt. Thus, the perforating speeds are directly proportional to the contact time, and to obtain high speeds it is necessary to have a sufficiently long contact arc, i.e., the arc within which the pins and the film are in contact. By eccentrically locating the pin drum within the outer drum, the contact angle ($x$) far exceeds that possible with the conventional opposed drum perforators (see FIGURES 1 and 3). In addition the contact distance can be increased while maintaining the same contact arc by increasing the diameters of the drums. FIGURES 4 and 5 are graphs which show the contact arc length and contact time, respectively, for various diameter drums and compares the device of this invention with the conventional opposed drum perforators. By employing the foregoing criteria, the eccentric roll perforator of this invention can be operated at speeds two to three times the speeds of conventional perforators. For example, film can be perforated at a rate of up to 1200 feet per minute.

Since the pins are heated to relatively high temperatures, it is advantageous to employ a cooling means to the outer drum. This can be accomplished by a cold air stream, cold water, chilled layon rolls and the like. FIGURE 8 depicts the end view of outer drum 20 which contains a series of connected water pipes 34 longitudinally spaced between the perforations in the outer drum.

Referring now to FIGURES 6 and 7, the pin drum 22 was sectionalized into components to minimize heat transfer between the pins and the internal shaft 42 of the pin drum. Between the pin drum heaters 28 and the pin drum external shaft 32 are insulating components 30 and contact supports 92. By a series of pins 36 and shoulder screws 38, the pin drum assembly is aligned and locked into position on the external shaft 32.

Referring now to the preferred embodiment described in FIGURES 9A–13, the pin drum assembly is mounted on external shaft 32 as described above. The external shaft 32 rotates on bearings 40 which rest upon internal shaft 42. Internal shaft 42 rotates about its center on pillow block bearings 48 which are mounted on lead screw assemblies 44 through supports 46.

Mounted on external shaft 32 is slip ring assembly 50. Electric power is transmitted through slip ring assembly 50 by a brush ring assembly (not shown). Two of the rings of the slip ring assembly are used for thermocouple takeoff for automatically controlling the pin drum temperature.

The pin drum 22 and the outer drum 20 are driven by a series of gears which coordinate the rotation of the two drums so that the pins of the pin drum 22 protrude and retract progressively through the slots in the outer drum 20 with no metal-to-metal contact. Shaft 52 is driven by a motor (not shown). Mounted on shaft 52 is gear 54 which engages the outer drum gear 56 which is mounted on the outer drum through drive gear flanges 58. Also mounted on shaft 52 is gear 60 which drives idler roll gears 62 and 62–A. Gear 62–A engages and drives the pin drum gear 64 which is mounted on internal shaft 32. The idler gears 62 and 62–A are mounted to allow freedom of movement between the pin drum 22 and the outer drum 20. The angles A and B (FIGURE 13) between these idler gears and the pin drum shaft 42 and the outer drum mountings allow the pins to move with essentially zero circumferential movement of the pin drum 22 relative to the outer drum 20. The additive effect of high back lash between gears would allow excessive movement of pins relative to the outer drum and cause interference problems. To reduce this effect, a fine adjustment mechanism 66, 66A and 66B between the mating gears was mounted.

Thus drive shaft 52 drives external shaft 32 which rotates pin drum 22 and also drives gear 56 which rotates the outer drum 20. Internal shaft 42 is rotated by outer drum 20 through ball bushing 68 and flange 94.

The outer drum is cooled by water fed through rotary joint 70 which feeds water to passage 72 in internal shaft 42. From passage 72, water is fed to a water distribution manifold 74 through hose 76. From manifold 74 the cooling water is distributed to tubes 34 within outer drum 20. The water is returned through manifold 74 to hose 78 and out passage 80 in internal shaft 42.

The outer drum rotates on a pair of external ball bearings 82 mounted at the extremities of the outer surface of outer drum 20. The outer drum is mounted on split bearing blocks 84 and 84A.

To change the amount of protrusion of the pins relative to the outer drum, lead screw assemblies 44 on each end are aligned relative to the pin horizontal line. By changing the lead screws, the internal shaft and the pin drum center can be changed relative to the rotational center of the outer drum.

In view of the high speeds obtainable while perforating, a chill roll 86 mounted on bearing blocks 88 was installed to cool the melted rings of polymer around each perforation.

In one embodiment the device was designed to operate at a maximum speed of 1,200 feet of film per minute. At this film speed it was found that a hot pin-to-film engagement time should be about $2.115 \times 10^{-4}$ minutes. Based on this time factor the size of the outer drum was set at a diameter of sixteen inches. Perforations of any desired pattern can be made in the drum. Preferably they are rectangular perforations to allow for thermal expansions and are beveled from the inside to allow the pins to swing easily into the perforations. Ninety-six stainless steel tubes (⅜" O.D. x ⅛" I.D.) for carrying the cooling water were fixed into holding spacers and machined to the outside diameter of the drum. The perforations, of course, must be spaced in rows between the longitudinally positioned cooling tubes.

The pin drum used was 13.782 inches in diameter. Pins 0.812 inch long having a taper length of $0.171 \pm .02$ inch were press-fitted into the pin drum so that the average diameter of the drum from pin point to pin point was 14.124 inches. They were fitted in the same pattern as the perforations made in the outer drum.

The distance between the centers of rotation of the pin drum and the outer drum was set at a maximum of 1.0625 inch and a minimum of 0.9699 inch. This allowed a maximum pin protrusion above the outer drum of 0.125 inch. At this protrusion the film holes have a diameter of about 0.091 inch. At minimum distance between the centers of rotation the film hole diameter is about 0.023 inch.

To heat the pin drum, 42 half-inch-diameter cartridge heaters were employed and were centered between the longitudinal rows of pins such that each pin was equidistant from the heat source. The temperature of the pins will depend upon the film to be perforated. The following table describes the results and operating conditions for several films.

| Sample | Thickness, mil. | Pin Protrusion, in. | Pin Drum Temp., ° C. | Speed, f.p.m. | Hole Dia., in. |
|---|---|---|---|---|---|
| Polyethylene | 1.5 | 0.119 | 400 | 300 | 0.068 |
| | 1.25 | 0.095 | 450 | 500 | 0.060 |
| | 1.0 | 0.095 | 450 | 800 | 0.050 |
| Heat-Shrinkable Polyethylene. | 1.0 | 0.119 | 400 | 800 | 0.059 |
| | | 0.099 | 400 | 300 | 0.084 |
| | 0.75 | 0.045 | 375 | 350 | 0.039 |
| Polyethylene Terephthalate. | 3.0 | 0.17 | 500 | 150 | 0.10 |
| | 1.5 | 0.17 | 500 | 100 | 0.16 |
| | 0.5 | 0.028 | 400 | 600 | 0.0265 |

After the film has been perforated it can be rolled. To eliminate the hard ridges that would be formed across the roll due to the grommets of polymer which surround each hole being wound upon each other, an oscillator may be provided. The perforator frame can be mounted on ball bearings 96 so that the perforator will oscillate perpendicular to the film web. A hydraulic cylinder 98 is used to oscillate the frame. The oscillation speeds are small relative to the film speed so that the film tracking misalignment is negligible. The randomization of the holes is caused by the movement of the pins across the web of film.

It is to be understood that the invention is not limited to the form disclosed but is intended to cover all modifications and alternate constructions falling within the spirit and scope of the invention as expressed in the appended claims.

The embodiments of the invention in which an exclusive property or privilege is claimed are defined as follows:

1. An apparatus for perforating thermoplastic sheet material which comprises a frame;

an outer drum having a plurality of perforations mounted on said frame for rotation;

a pin drum having a plurality of tapered pins extending radially therefrom to conform with the perforations of said outer drum, said pin drum mounted within said outer drum for rotation on an axis offset from the rotational axis of said outer drum, and positioned such that said pins protrude through said perforations along a portion of the circumference of said outer drum;

gear means to rotate both said drums in the same direction such that said pins progressively protrude through said perforations and retract with no metal-to-metal contact; said gear means so positioned and constructed to provide for adjustment of said pin drum center relative to said outer drum center;

means to shift the frame so as to vary the perforations across the web of sheet material;

means positioned within said pin drum to uniformly heat said pins; and means positioned within said outer drum to cool said drum.

2. The device of claim 1 which includes a chill roll positioned to receive the perforated sheet material.

References Cited

UNITED STATES PATENTS

| | | | |
|---|---|---|---|
| 2,261,315 | 11/1941 | Thorsen | 83—345 X |
| 2,748,863 | 6/1956 | Benton | 83—345 X |

ANDREW R. JUHASZ, *Primary Examiner.*